US010449920B2

(12) United States Patent
Shen et al.

(10) Patent No.: US 10,449,920 B2
(45) Date of Patent: Oct. 22, 2019

(54) REAR BUMPER SNOW AND ICE SHIELD

(71) Applicant: Toyota Motor Engineering & Manufacturing North America, Inc., Erlanger, KY (US)

(72) Inventors: Mingher Fred Shen, Ann Arbor, MI (US); Scott L. Frederick, Brighton, MI (US); Brandon W. Letcher, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 181 days.

(21) Appl. No.: 15/373,939

(22) Filed: Dec. 9, 2016

(65) Prior Publication Data

US 2018/0162305 A1    Jun. 14, 2018

(51) Int. Cl.
*B60R 19/48* (2006.01)
*B60R 19/02* (2006.01)

(52) U.S. Cl.
CPC .......... *B60R 19/48* (2013.01); *B60R 19/023* (2013.01)

(58) Field of Classification Search
CPC ........ B60R 19/48; B60R 19/023; B60R 3/02; B60J 11/025; G01S 17/026
See application file for complete search history.

(56) References Cited

U.S. PATENT DOCUMENTS

| | | | | |
|---|---|---|---|---|
| 3,471,070 A | * | 10/1969 | Olson | ..................... B60R 9/065 |
| | | | | 224/402 |
| 3,501,170 A | * | 3/1970 | Da Valle | .................. B60D 1/02 |
| | | | | 280/500 |
| 3,614,136 A | * | 10/1971 | Dent | ....................... B60R 19/48 |
| | | | | 220/255 |
| 4,138,152 A | * | 2/1979 | Prue | ........................ B60R 19/48 |
| | | | | 224/491 |
| 4,570,986 A | * | 2/1986 | Sams | ...................... B60R 19/48 |
| | | | | 224/402 |
| 4,901,895 A | * | 2/1990 | Gancarz | .................... B60P 7/04 |
| | | | | 224/402 |
| D316,070 S | * | 4/1991 | Riss | ............................ D12/169 |
| 5,129,678 A | | 7/1992 | Gurbacki | |
| 5,135,274 A | * | 8/1992 | Dodd | ..................... B60R 11/06 |
| | | | | 224/491 |
| 5,364,142 A | * | 11/1994 | Coiner | .................... B60R 19/48 |
| | | | | 293/106 |

(Continued)

*Primary Examiner* — Erez Gurari
(74) *Attorney, Agent, or Firm* — Christopher G. Darrow; Darrow Mustafa PC (57) ABSTRACT

Described herein are various embodiments for a rear bumper snow and ice shield. In an embodiment, a corrosion prevention device may be mounted on a vehicle. The corrosion prevention device may comprise a shield, a support, a mechanism, a left rail, and a right rail. The shield may comprise a left protrusion on a left end, a right protrusion on a right end, a front end, and a rear end. The support may comprise an upper end supporting the shield, and a lower end. The mechanism may be configured to secure the support in a raised position and further configured to secure the support in a lowered position. The lower end of the support may be in contact with the mechanism. The left protrusion may be housed within the left rail and the right protrusion may be housed within the right rail.

13 Claims, 7 Drawing Sheets

(56) References Cited

U.S. PATENT DOCUMENTS

| | | | | |
|---|---|---|---|---|
| 5,823,585 A * | 10/1998 | Tanguay | ............... | B60R 19/48 |
| | | | | 293/106 |
| 5,979,953 A * | 11/1999 | Rinehart | ............... | B60R 19/48 |
| | | | | 293/106 |
| 6,598,914 B1 * | 7/2003 | Dixon | ................ | B60K 11/04 |
| | | | | 293/106 |
| 7,121,597 B2 * | 10/2006 | Chuang | ................ | B60R 9/06 |
| | | | | 293/117 |
| 8,596,507 B2 * | 12/2013 | Lee | ..................... | B60R 5/04 |
| | | | | 224/488 |
| 8,602,467 B2 * | 12/2013 | Lee | ..................... | B60R 19/48 |
| | | | | 293/106 |
| 8,668,240 B2 | 3/2014 | Elliott et al. | | |
| 8,678,461 B2 * | 3/2014 | Cha | ..................... | B60R 19/48 |
| | | | | 224/489 |
| 8,789,865 B2 * | 7/2014 | Cha | ..................... | B60R 19/48 |
| | | | | 293/106 |
| 9,434,317 B2 * | 9/2016 | Nania | ................ | B60R 19/48 |
| 2005/0242558 A1 | 11/2005 | Cohen | | |
| 2010/0026019 A1 * | 2/2010 | Couto | ................ | B60R 19/48 |
| | | | | 293/118 |
| 2013/0088034 A1 * | 4/2013 | Cha | ..................... | B60R 19/48 |
| | | | | 296/37.1 |
| 2013/0088035 A1 * | 4/2013 | Cha | ..................... | B60R 19/48 |
| | | | | 296/37.1 |
| 2014/0339800 A1 | 11/2014 | Siddons | | |
| 2015/0344136 A1 * | 12/2015 | Dahlstrom | ............ | B64C 39/024 |
| | | | | 701/3 |
| 2017/0136838 A1 * | 5/2017 | Merino Almeida | ..... | B60D 1/54 |
| 2018/0009303 A1 * | 1/2018 | Romero Regalado | ................... | |
| | | | | B60J 11/025 |

* cited by examiner

REAR BUMPER SNOW AND ICE SHIELD

TECHNICAL FIELD

The subject matter described herein relates in general to anti-corrosion devices and, more particularly, to rear bumper snow and ice shields.

BACKGROUND

Vehicles are driven in varying weather conditions. In some climates, snow and ice are prevalent during winter months. In these climates, the roads are often treated with deicing materials, e.g., salt. When a vehicle is parked or moving, snow and/or ice builds up on the rear bumper or other surfaces of the vehicle. The snow and/or ice as well as other debris, e.g., road salt, cause corrosion of the vehicle's paint and/or metal body while in contact with the vehicle's body.

SUMMARY

This disclosure describes various embodiments for a rear bumper snow and ice shield. In one embodiment, a corrosion prevention device may be mounted on a vehicle. The corrosion prevention device may comprise a shield, a support, a mechanism, a left rail, and a right rail. The shield may comprise a left protrusion on a left end, a right protrusion on a right end, a front end, and a rear end. The support may comprise an upper end supporting the shield, and a lower end. The mechanism may be configured to secure the support in a raised position and further configured to secure the support in a lowered position. The lower end of the support may be in contact with the mechanism. The left protrusion may be housed within the left rail and the right protrusion may be housed within the right rail.

In another embodiment, a method for corrosion prevention on a vehicle is described. The method may comprise receiving an input indicating that a current position of a corrosion prevention device should be changed; and transmitting a control signal to the corrosion prevention device indicating that the current position of the support should be changed.

DETAILED DESCRIPTION

Described herein are embodiments of a rear bumper snow and ice shield assembly. In other embodiments, the shield assembly may be installed on surfaces other than the rear bumper for prevention of snow and ice buildup. The shield assembly may comprise a shield portion. The shield portion may be a flat surface made of a rigid material. The rigid material may be corrosion resistant. The shield portion may be in contact with and/or supported by a support. The support may be a fixed length or may be variable length, e.g. a telescoping support. The support may be connected to or in contact with a mechanism used for raising and lowering the support.

The mechanism may be a mechanical mechanism, a motor, or some other mechanism capable of raising and lowering the support. The mechanism may also be used to hold the support in the raised or lowered position. As the support is raised and lowered, the shield portion is also raised and lowered. In the raised position, snow and ice may be directed away from the vehicle off of the face of the shield portion. In an embodiment, the shield assembly may have a latch installed connected to the mechanism.

The shield may move along one or more rails installed on the rear bumper or other surface of the vehicle. A protrusion on the shield portion may be inserted into the rails. In an embodiment, the protrusion may be a wheel or other moving component. In an embodiment, a storage bin may be installed under the shield, such that the shield acts as a lid for the storage bin.

Figure 1A:
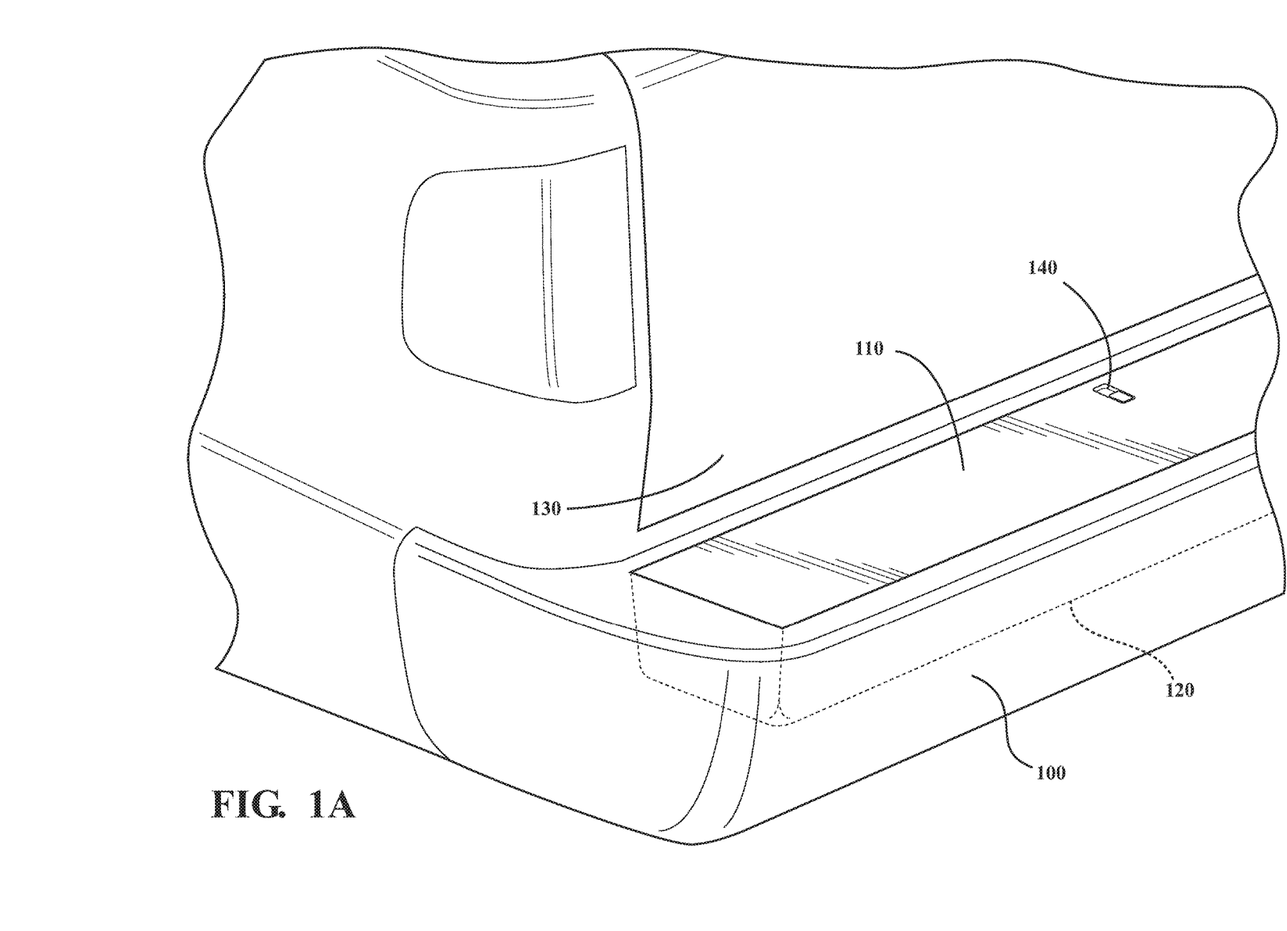
FIG. 1A is a diagram of an embodiment of a rear bumper with shield in a lowered position.
Figure 1B:
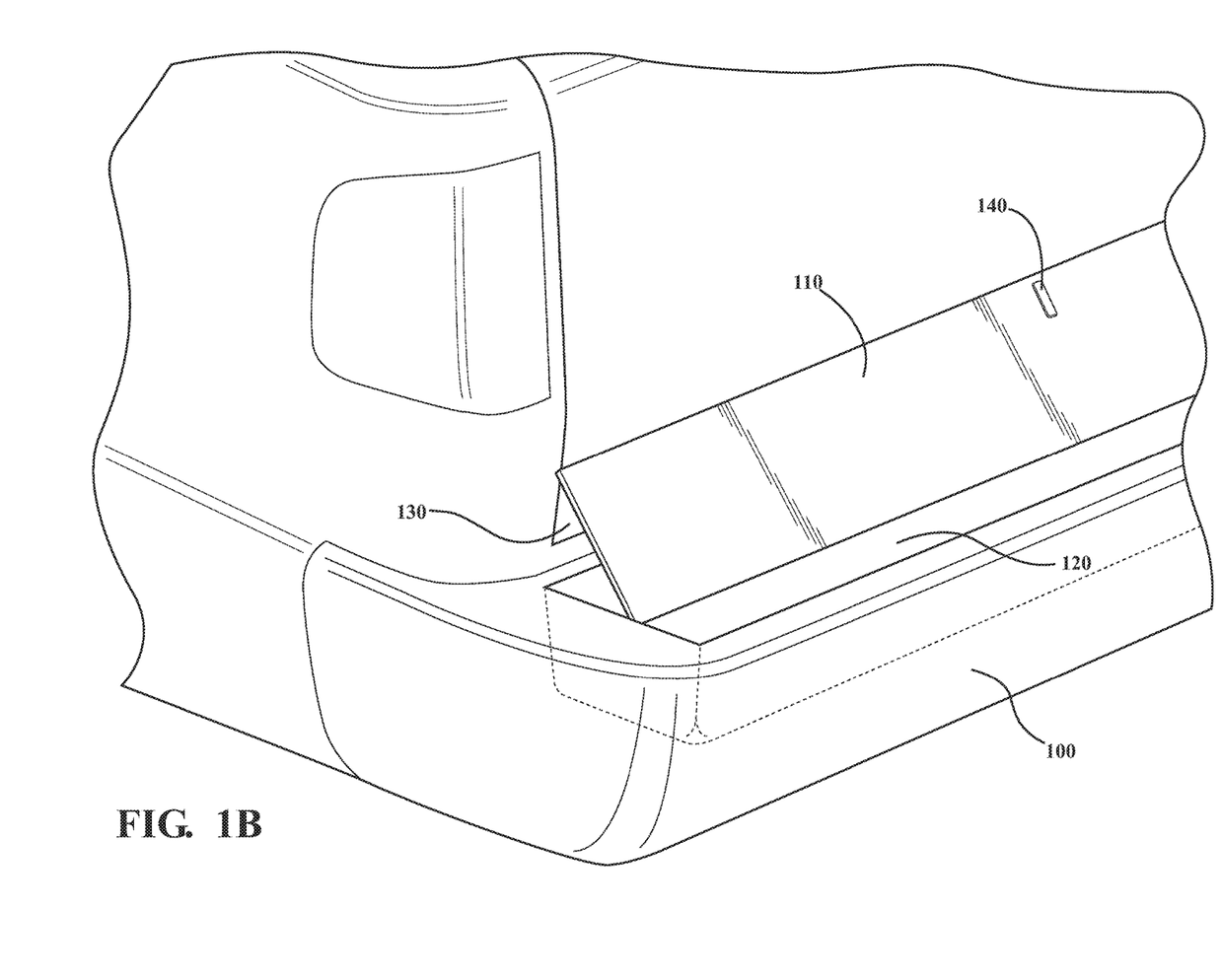
FIG. 1B is a diagram of an embodiment of a rear bumper with shield in a raised position.

FIG. 1A is a diagram of an embodiment of a rear bumper with shield in a lowered position. A shield 110 may be installed on a rear bumper 100 of a vehicle. In other embodiments, shield 110 may be installed on other vehicle surfaces where snow or ice may accumulate. An optional storage bin 120 may be installed beneath shield 110. Shield 110 may be raised by activating latch 140. In other embodiments, the shield 110 may be raised and lowered using other devices or mechanisms, some of which are described in greater detail below. A tailgate 130 may be present behind bumper 100. In an embodiment, the vehicle may have a liftgate, trunk lid, or some other access port to the vehicle rather than tailgate 130. FIG. 1B is a diagram of an embodiment of a rear bumper with shield in a raised position. Shield 110 may be raised against tailgate 130. In the raised position shield 110 may prevent snow, ice, or other debris from accumulating against the tailgate 130. Snow, ice, or other debris (e.g., road deicer), may cause corrosion on the tailgate 130. The angled surface of the raised shield 110 may cause snow, ice, or other debris to fall off the bumper and thus not accumulate against tailgate 130.

Figure 2A:
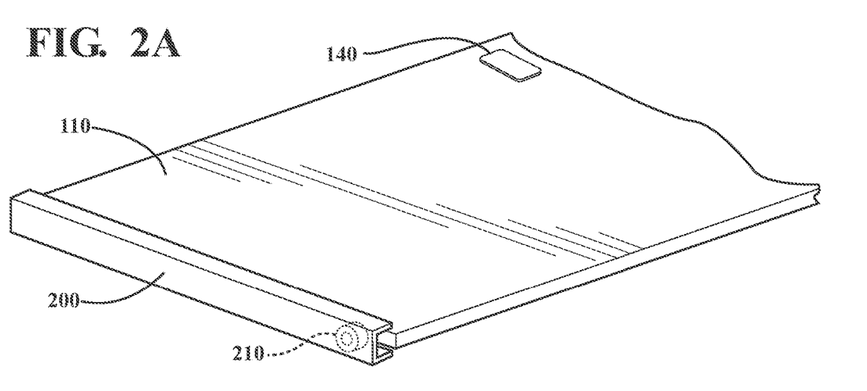
FIG. 2A is a diagram of an embodiment of a shield in a lowered position.
Figure 2B:
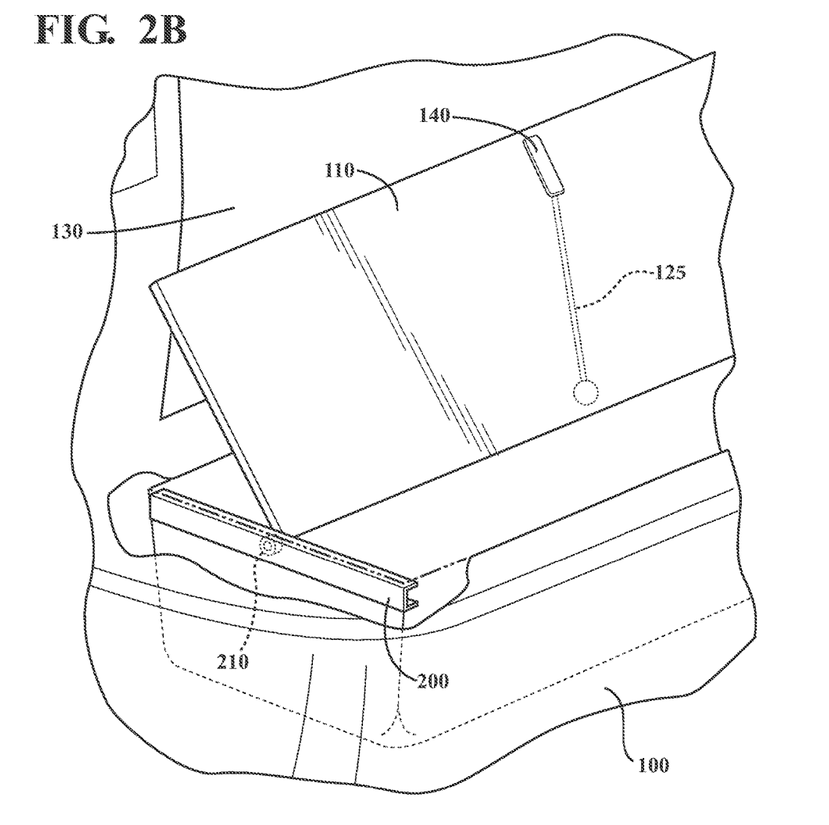
FIG. 2B is a diagram of an embodiment of a shield in a raised position.

FIG. 2A is a diagram of an embodiment of a shield in a lowered position. Shield 110 may be installed in a rail 200. Shield 110 may have a wheel 210 that moves within a channel of rail 200 when the shield 110 is raised or lowered. In an embodiment, another mechanism may be used in place of wheel 210. For example, a dowel or some other protrusion that allows shield 110 to move within the channel of rail 200. FIG. 2B is a diagram of an embodiment of a shield in a raised position. Shield 110 may be raised to prevent snow, ice, or other debris from accumulating against tailgate 130. Latch 140 may be lifted to raise shield 110. Shield 110 may be supported by support assembly 125. Support assembly 125 may be a telescoping support rod, a rigid support rod, or some other assembly to hold shield 110 in a raised position. Support assembly 125 may also comprise components for securing shield 110 in a lowered position.

Figure 3:
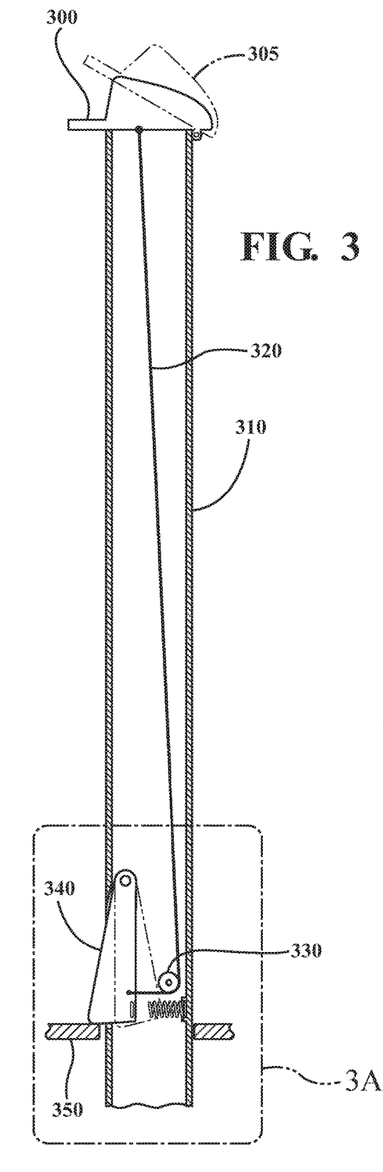
FIG. 3 is a diagram of an embodiment of a spring-loaded support assembly.
Figure 3A:
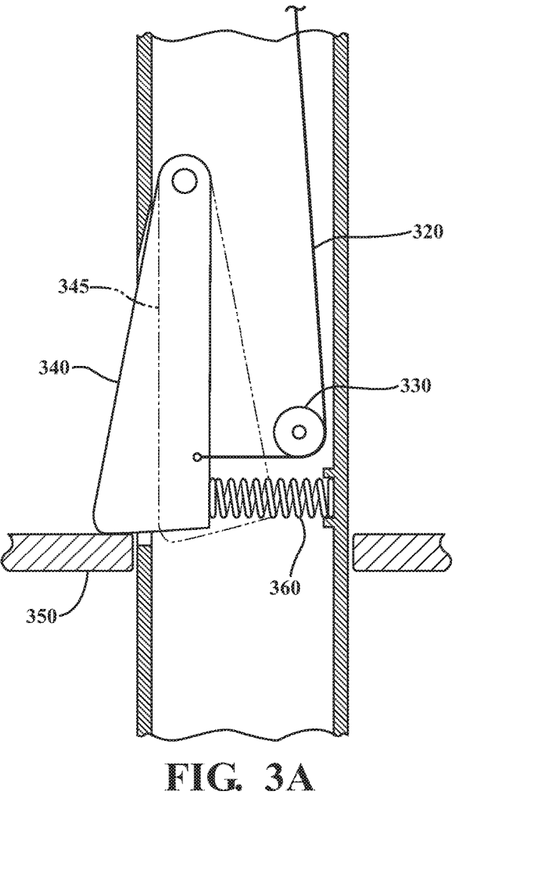
FIG. 3A is a diagram of an enlarged portion of an embodiment of a spring-loaded support assembly.

FIGS. 3 and 3A show an embodiment of a spring-loaded support assembly. The spring-loaded support assembly may comprise a latch 300. Latch 300 may be raised to position 305 in order to raise or lower a shield, e.g., shield 110. Latch 300 may be coupled to support 310. Support 310 may be a rigid rod or may be collapsible, e.g., a telescoping rod. Support 310 may be hollow. Cable 320 may be within support 310 and may be connected to latch 300 and catch 340. Moving latch 300 to position 305 may pull cable 320 around post 330 causing catch 340 to retract to position 345. Spring 360 may be compressed when latch 300 is lifted to position 305 and may press against catch 340. Post 330 may be a post, a wheel, a pullet or some other fixture for cable 320 to move against. Catch 340 may hold the spring-loaded support assembly in a raised position by resting against surface 350. Surface 350 may be a surface of a bumper, a surface in an optional storage bin, or some other surface.

Figure 4:
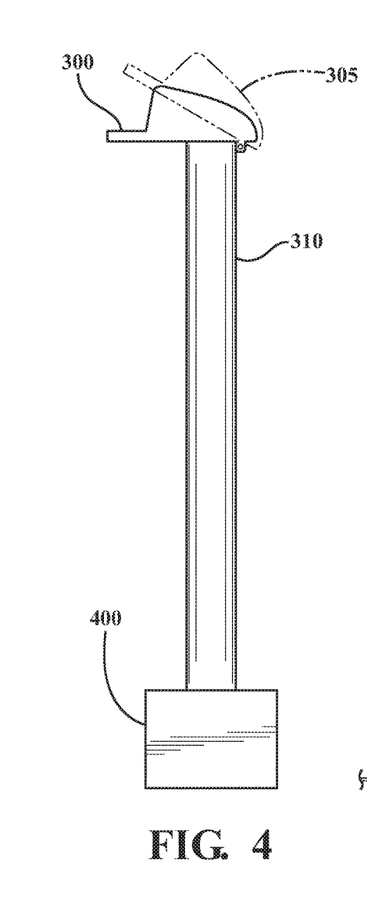
FIG. 4 is a diagram of an embodiment of a ratcheting support assembly.

FIG. 4 is a diagram of an embodiment of a ratcheting support assembly. The ratcheting support assembly may comprise a ratchet assembly 400 connected to support 310. Support 310 may be a rigid rod or may be collapsible, e.g., a telescoping rod. Support 310 may be hollow or solid. Moving latch 300 to position 305 may release the ratchet assembly 400 to allow the support 310 to move up or down. Lowering latch 300 may result in the ratchet assembly 400 locking in place.

Figure 5:
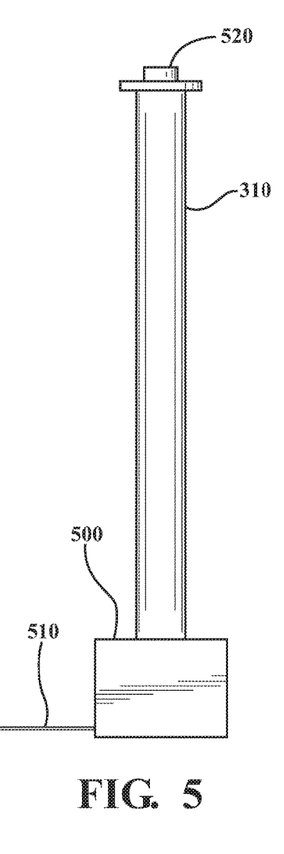
FIG. 5 is a diagram of an embodiment of a locally controlled motorized support assembly.

FIG. 5 is a diagram of a locally controlled motorized support assembly. The locally controlled motorized support assembly may comprise a motor assembly 500 connected to support 310. Support 310 may be a rigid rod or may be collapsible, e.g., a telescoping rod. Support 310 may be hollow or solid. Motor 500 may receive power via line 510 from a power source. The power source may be provided by the vehicle or by a battery or some other power supply. Motor 500 may be controlled by button 520. If a shield is in the lowered position and button 520 is depressed, the shield may raise to a raised position. If a shield is in the raised position and button 520 is depressed, the shield may lower to a lowered position. In some embodiments, button 520 may be remotely located, for example, in the cab of the vehicle.

Figure 6A:
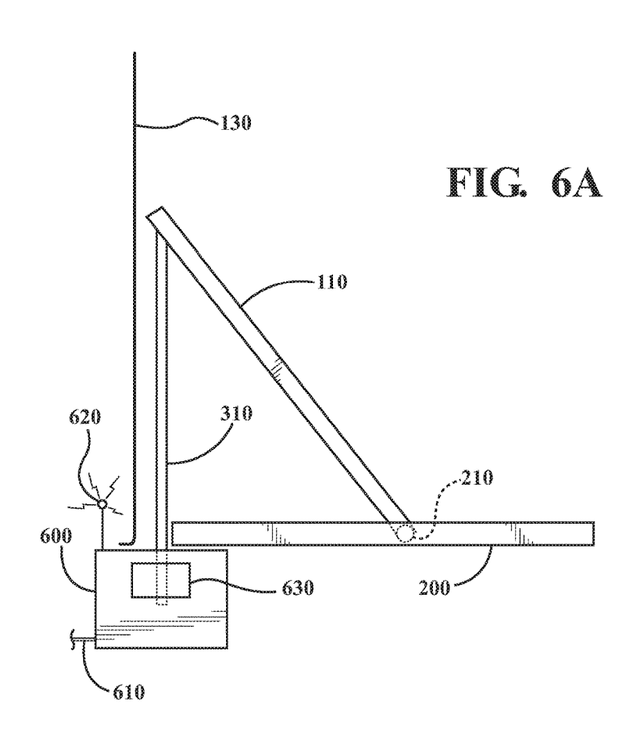
FIG. 6A is a diagram of an embodiment of a shield assembly in a raised position.

FIG. 6A is a diagram of an embodiment of a shield assembly in a raised position. Shield 110 may be couple to support 310. Support 310 may be a rigid rod or may be collapsible, e.g., a telescoping rod. Support 310 may be hollow or solid. Support 310 may be coupled to a motor assembly 600. Motor assembly 600 may receive power via line 610 from a power source. The power source may be provided by the vehicle or by a battery or some other power supply. Line 610 may be copper or some other medium for transmitting power and/or data signals.

Motor assembly 600 may receive control signals via wireless transceiver 620 and/or line 610. The control signals may include commands to raise or lower shield 110 as well as other information. The control signals may be received from a system controller. The system controller may be a part of the vehicle or may be a standalone controller for the shield 110. A user may interact with the system controller from the interior of vehicle and/or via a remote control or some other remote device, e.g. a mobile device or key fob. The user may press a button or some other controller to send a command to raise or lower the shield 110. The command may cause the motor assembly 600 to activate and raise or lower support 310. When support 310 raises or lowers, shield 110 may raise or lower accordingly.

In an embodiment, the system controller may be configured to detect precipitation that may lead to snow and/or ice accumulation on the bumper of the vehicle. Sensors installed on the vehicle may detect precipitation and report the detection to the system controller. The system controller may receive weather reports from a weather reporting service. Based on the determined weather, the system controller may automatically raise and/or lower the shield 110.

A sensor assembly 630 may be in communication with the system controller. The communication may be via wire and/or wireless. Sensor assembly 630 may be configured to detect whether the shield 110 is raised or lowered. In an embodiment, if a user attempts to open a tailgate or liftgate where a shield 110 is installed, a signal may be sent to the sensor assembly and/or the system controller indicating an attempt to open the tailgate. If the shield 110 is in a raised position, the system controller may cause the shield 110 to be lowered prior to opening the tailgate. In an embodiment, sensor assembly 630 may contain a proximity sensor or may receive information from an external proximity sensor, e.g., sonar in the bumper. The proximity sensor may detect when a person approaches the tailgate of the vehicle. If a person approaches the tailgate and the shield 110 is in a raised position, the system controller may cause the shield 110 to lower.

Figure 6B:
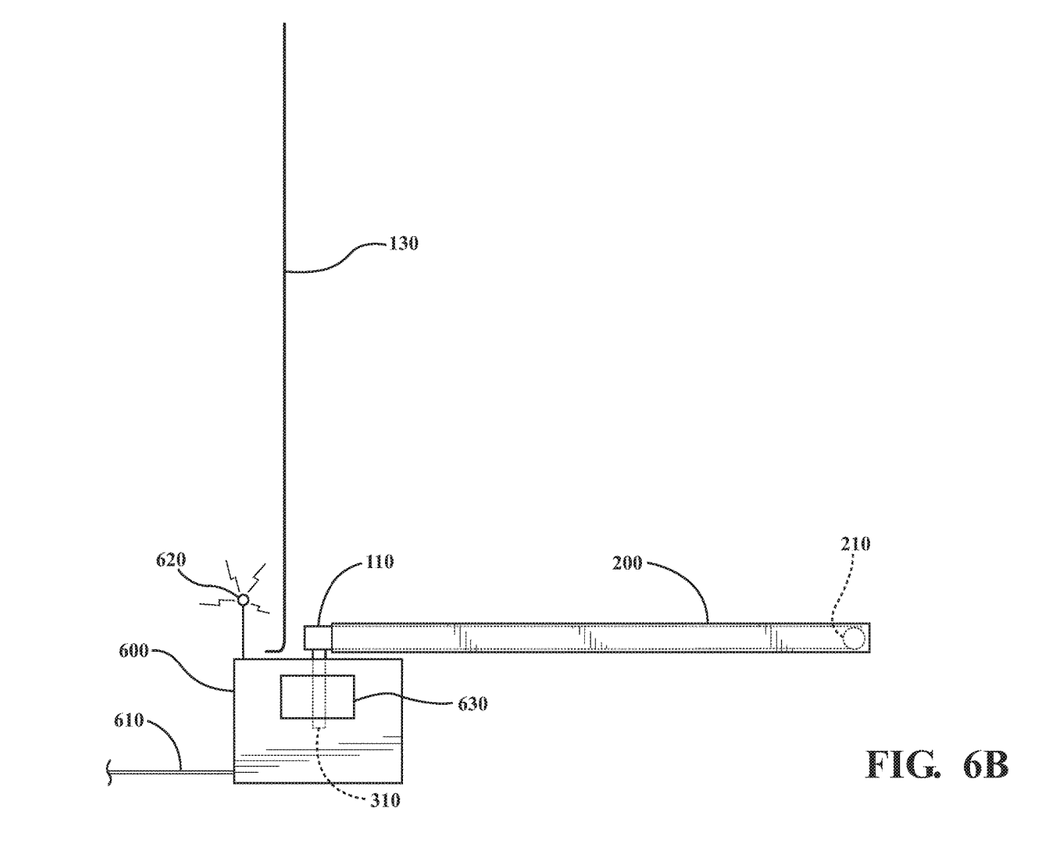
FIG. 6B is a diagram of an embodiment of a shield assembly in a lowered position.

FIG. 6B is a diagram of an embodiment of a shield assembly in a lowered position. The front end of shield 110 is closest to tailgate 130. The front end of shield 110 may remain substantially equidistant to the tailgate 130 in both the raised and lowered position. The rear end of the shield 110 moves away from the tailgate 130 as the shield 110 is lowered. Wheel 210 may move in rail 200 while shield 110 is raised or lowered. In an embodiment, some other protrusion may be connected to or part of shield 110 and may be inserted into rail 200. Support 310 may be collapsed within motor assembly 600. In this case, support 310 may be telescopic. In another embodiment, support 310 may be rigid and may pass through motor assemble 600 as the support is collapsed. In other embodiments, if support 310 is rigid, support 310 may pass through whatever mechanism is used for securing or moving support 310, and/or may pass through whatever surface rail 200 is mounted to.

In some embodiments, a shield 110 may be installed on any surface of a vehicle where buildup of snow, ice, or other corrosive materials may occur. For example, a front bumper, running boards, or some other surface of a vehicle.

Figure 7:
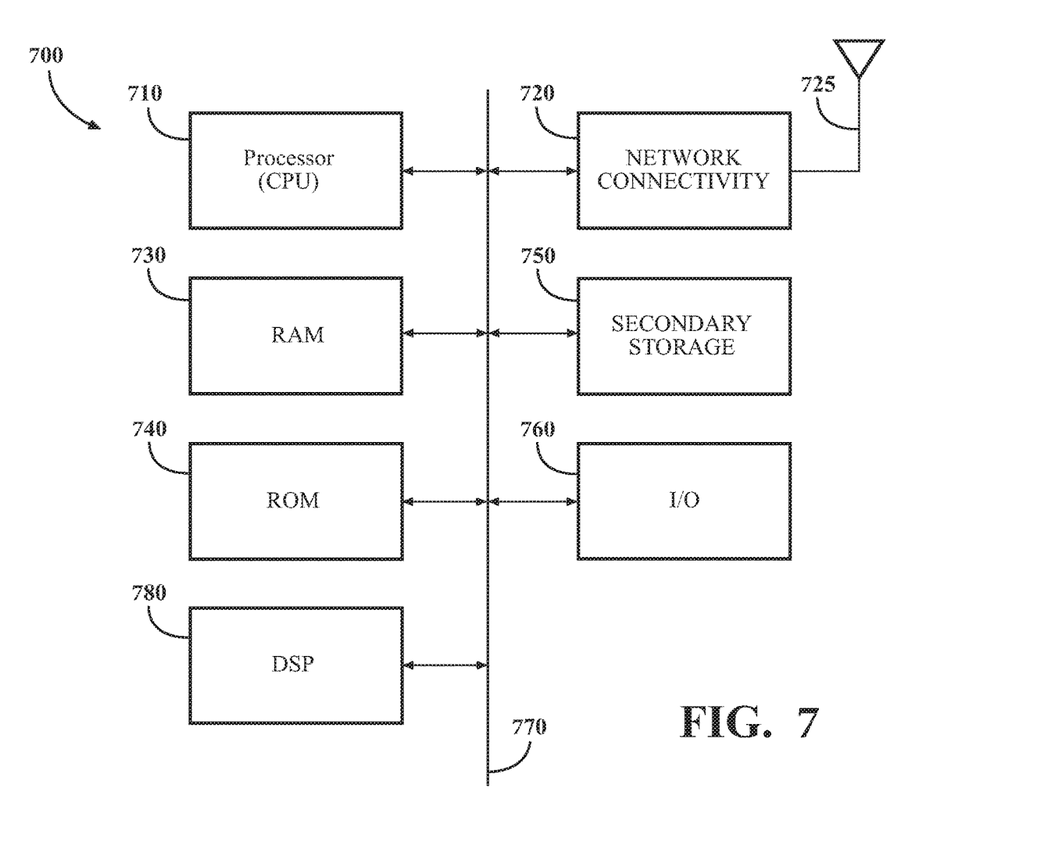
FIG. 7 is a diagram of an embodiment of a system suitable for implementing one or more embodiments disclosed herein.

FIG. 7 is a diagram of an embodiment of a system 700 that includes a processor 710 suitable for implementing one or more embodiments disclosed herein, e.g., a system controller. The processor 710 may control the overall operation of the system.

In addition to the processor 710 (which may be referred to as a central processor unit or CPU), the system 700 might include network connectivity devices 720, random access memory (RAM) 730, read only memory (ROM) 740, secondary storage 750, and input/output (I/O) devices 760. These components might communicate with one another via a bus 770. In some cases, some of these components may not be present or may be combined in various combinations with one another or with other components not shown. These components might be located in a single physical entity or in more than one physical entity. Any actions described herein as being taken by the processor 710 might be taken by the processor 710 alone or by the processor 710 in conjunction with one or more components shown or not shown in the drawing, such as a digital signal processor (DSP) 780. Although the DSP 780 is shown as a separate component, the DSP 780 might be incorporated into the processor 710.

The processor 710 executes instructions, codes, computer programs, or scripts that it might access from the network connectivity devices 720, RAM 730, ROM 740, or secondary storage 750 (which might include various disk-based systems such as hard disk, floppy disk, or optical disk). While only one CPU 710 is shown, multiple processors may be present. Thus, while instructions may be discussed as being executed by a processor, the instructions may be executed simultaneously, serially, or otherwise by one or multiple processors. The processor 710 may be implemented as one or more CPU chips and may be a hardware device capable of executing computer instructions.

The network connectivity devices 720 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, controller area network (CAN) transceiver devices, and/or other well-known devices for connecting to networks. These network connectivity devices 720 may enable the processor 710 to communicate with the Internet or one or more telecommunications networks or other networks from which the processor 710 might receive information or to which the processor 710 might output information. The network connectivity devices 720 might also include one or more transceiver components 725 capable of transmitting and/or receiving data wirelessly.

The RAM 730 might be used to store volatile data and perhaps to store instructions that are executed by the processor 710. The ROM 740 is a non-volatile memory device that typically has a smaller memory capacity than the memory capacity of the secondary storage 750. ROM 740 might be used to store instructions and perhaps data that are read during execution of the instructions. Access to both RAM 730 and ROM 740 is typically faster than to secondary storage 750. The secondary storage 750 is typically comprised of one or more disk drives or tape drives and might be used for non-volatile storage of data or as an over-flow data storage device if RAM 730 is not large enough to hold all working data. Secondary storage 750 may be used to store programs that are loaded into RAM 730 when such programs are selected for execution.

The I/O devices 760 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 725 might be considered to be a component of the I/O devices 760 instead of or in addition to being a component of the network connectivity devices 720.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium.

What is claimed is:

1. A corrosion prevention device mounted on a vehicle, the corrosion prevention device comprising:
   a shield comprising: a left protrusion on a left end; a right protrusion on a right end; a front end on a side facing the vehicle; and a rear end opposite the front end;

a support comprising: an upper end supporting the shield; and a lower end;

a mechanism configured to secure the support in a raised position and further configured to secure the support in a lowered position, the lower end of the support in contact with the mechanism;

a left rail, the left protrusion movably housed to slide within a first channel in the left rail; and a right rail, the right protrusion movably housed to slide within a second channel in the right rail wherein the front end of the shield is substantially equidistant from a surface of the vehicle in the raised position and the lowered position, and wherein the rear end of the shield is closer to the surface in the raised position than in the lowered position, and the surface is a portion of one of: a tailgate, a liftgate, or a trunk lid.

2. The corrosion prevention device of claim 1, wherein the left rail and the right rail are installed on a rear bumper of the vehicle.

3. The corrosion prevention device of claim 1, wherein the mechanism comprises an electric motor configured to:

lower the support from the raised position to the lowered position; and raise the support from the lowered position to the raised position.

4. The corrosion prevention device of claim 3, further comprising a system controller in communication with the mechanism.

5. The corrosion prevention device of claim 4, wherein the system controller is configured to:

receive an input, the input indicating that a current position of the support should be changed; and transmit a control signal to the mechanism indicating that the current position of the support should be changed.

6. The corrosion prevention device of claim 4, wherein the system controller is configured to:

receive an opening signal indicating that an attempt to move the surface has occurred;

determine that the support is in the raised position; and transmit a control signal to the mechanism comprising a command to lower the support.

7. The corrosion prevention device of claim 4, wherein the system controller is configured to:

determine at least one of: a current weather condition and a forecast weather condition; and transmit, based at least in part on at least one of: the current weather condition and the forecast weather condition, a control signal to the mechanism comprising a command to raise the support.

8. The corrosion prevention device of claim 7, wherein the system controller is further configured to:

determine the current weather condition based, at least in part, on data from sensors of the vehicle.

9. The corrosion prevention device of claim 4, wherein the system controller is configured to:

determine a person is approaching the vehicle;

determine that the support is in the raised position; and transmit a control signal to the mechanism, the control signal comprising a command to lower the support.

10. The corrosion prevention device of claim 3, further comprising a button, wherein the electric motor is activated based, at least in part, depression of the button.

11. The corrosion prevention device of claim 1, further comprising a latch coupled to the upper end of the support.

12. The corrosion prevention device of claim 11, wherein the mechanism comprises a catch configured to recess when the latch is raised.

13. The corrosion prevention device of claim 1, wherein the corrosion prevention device is installed as a cover for a storage bin displaced within a bumper of the vehicle.

* * * * *